US005377120A

United States Patent [19]

Humes et al.

[11] Patent Number: 5,377,120

[45] Date of Patent: Dec. 27, 1994

[54] APPARATUS FOR COMMINGLING & ADDRESSING MAIL PIECES

[76] Inventors: Carl L. Humes, 508 N. 67th St., Wauwatosa, Wis. 53213; Lawrence W. Dougherty, 1220 Timber Dr., Sleepy Hollow, Ill. 60118

[21] Appl. No.: 897,066

[22] Filed: Jun. 11, 1992

[51] Int. Cl.[5] .................... G06F 15/20; B41F 13/54; B65H 39/02

[52] U.S. Cl. .................... 364/478; 270/1.1; 270/58; 364/464.02

[58] Field of Search .................... 364/478, 401, 464.02, 364/400, 402, 464.01, 464.03; 235/375; 270/1.1, 58

[56] References Cited

U.S. PATENT DOCUMENTS

| | | | |
|---|---|---|---|
| 4,800,505 | 1/1989 | Axelrod et al. | 364/478 |
| 4,800,506 | 1/1989 | Axelrod et al. | 364/478 |
| 4,817,042 | 3/1989 | Pintsov | 364/478 |
| 4,956,782 | 9/1990 | Freemann et al. | 364/464.03 |
| 5,028,192 | 7/1991 | Lindsay et al. | 412/1 |
| 5,053,955 | 8/1991 | Peach et al. | 364/401 |
| 5,068,797 | 11/1991 | Sansone et al. | 364/478 |
| 5,072,400 | 12/1991 | Manduley | 364/478 |
| 5,072,401 | 12/1991 | Sansone et al. | 364/478 |
| 5,119,306 | 6/1992 | Metelits et al. | 364/464.02 |
| 5,142,482 | 8/1992 | Sansone | 364/478 |

OTHER PUBLICATIONS

Article from *The Milwaukee Journal*, Mar. 12, 1991, p. C7.

*Primary Examiner*—Jerry Smith
*Assistant Examiner*—Jim Trammell
*Attorney, Agent, or Firm*—Roland W. Norris

[57] ABSTRACT

An apparatus ideally suited for the small mailing service is disclosed. The apparatus can take pro-printed, un-addressed mail pieces of non-identical size delivered to the mailing service from different merchants and combine the mail pieces to create mailing bundles at the lowest postal rate and group the bundles to create a single mailing. In the apparatus a computer serves to take the merchant mailing lists, merge and sort the entries thereon into lowest postal rate groupings, and use this merged data base to enable a sequence controller and associated machinery to physically commingle and address the non-identical mail pieces into the single mailing bundle. Provision is also made for generating required postal service documentation and invoices from the mailing service to the merchants.

19 Claims, 6 Drawing Sheets

APPARATUS FOR COMMINGLING & ADDRESSING MAIL PIECES

BACKGROUND OF THE INVENTION

1. Field of the Invention

The present invention relates generally to mail piece handling machines. The present invention relates specifically to machines for preparing a plurality of preprinted unaddressed, non-alike mail pieces from unpredetermined sources into grouped bundles organized in a manner to receive low postal rates, the aggregated bundles constituting a "mailing", for delivery to a post office such as the U.S. Postal Service.

2. Description of the Related Art

A large number of merchants maintain their customer data bases on computers which they use to preform several functions, one of which is to print addresses for pieces they wish to mail to selected customers.

For the most part the merchants print the addresses on lapels, apply the labels to the mail pieces, and mail them at the first class rate because postal regulations are too complicated to obtain a lower rate. Several large merchants do use the lower discount rate available because they can afford mailing services which apply the rules and regulations of the United States Postal Service to obtain the lower rate. Small volume merchants are often unable to obtain these favorable rates due to lack of knowledge or low mailing volume.

In general postal rates are dependent upon the degree of specificity of addressing and the amount of presorting which is done by the merchant or his mailing service prior to delivery of the mail to the post office.

the United States Postal Service has, and is, converting to automatic mail handling equipment in order for the Postal Service to handle large volumes of mail at a faster rate.

Due to this automation, lower postal rates are available for mail pieces which are addressed with machine readable addressing such as bar codes or the like. Further, mail pieces sorted into mailings according to the zip code first three digits, last two digits, down to zip+4 digits and the mail carrier route level, resulting in progressively lower rates. However, a minimum number of pieces must be in each grouping to qualify for the lower postal rates.

It will be readily appreciated that a small volume merchant would lack the number of pieces necessary to achieve a mailing qualifying for the low rate available to mailings sorted in bundles down to the carrier route level, even if his customers were concentrated in a single metropolitan area.

Heretofore, the known apparatuses for the automatic addressing and sorting of mail pieces into mailings have been focused on pieces of known size and thickness coming from a single source or merchant. Some known apparatuses, exemplified by U.S. Pat. No. 4,800,506, have performed these functions by first addressing the mailing pieces, then tracking the pieces with optical character readers (OCR) and operating upon the pieces according to the information received by the OCR . The complexity of these OCR apparatuses makes them very expensive and, therefore, unobtainable to the small merchant or mailing service wishing to use them.

Another type of known apparatus, exemplified by U.S. Pat. No. 5,053,955, creates a merged data base of merchants' customer address lists grouped by the lowest postal rate. Then using a corresponding file of information to print on each mailing piece according to the merchant's needs, the apparatus serially prints and addresses a are determined postcard-format mail piece for each addressee according to the grouped address list.

Both of the above prior art apparatuses contemplate very large mailings to be bundled in order to achieve the economies of scale necessary to economically operate such machinery. Further, each exemplary prior art apparatus "knows" what type, size and thickness, of mail piece hereinafter "piece", it is to process before sending it to the piece-handling portion of the apparatus.

The average merchant, however, is unable to achieve the economies of scale necessary to utilize the known apparatuses. The average merchant has his own unique fliers, usually single sheets of paper, printed by a printing company and wishes to address and mail these pieces at the lowest cost. A mailing service desiring to serve the average merchant must accommodate these preprinted, unaddressed, non-alike low volume mailings without prior knowledge of the type of pieces to be mailed.

A need therefore exists for an affordable apparatus which will take several merchants' address lists, sort and merge the addresses according to postal rates in order to achieve the volume of mail necessary to obtain a bundle with low postal rates, by developing the lowest rate groupings for these pieces.

The needed apparatus must then take the unaddressed pieces of whatever size and/or type the merchant has had printed, and commingle and, address them according to postal regulations, and segregate the grouped pieces into bundles to produce mailings deliverable to the post office for delivery at the lowest postal rates.

SUMMARY OF THE INVENTION

The present invention discloses a machine for lowering the mailing costs of small volume merchants by producing bundles for low postal rate mailings which are made up of the commingled pieces from a plurality of merchants. The machine comprises, in the preferred embodiment, a first computer operable to combine the mailing lists of a plurality of merchants and group the addresses on the mailing lists according to the lowest postal rate. The first computer is further operable to generate the address information required by postal regulations, such as bar codes or zip+4 numbers, for each address; and to further assign a merchant- identifier tag to each address thus creating a merged data base of the merchants' mailing lists. The first computer is further operable to generate documentation for the post office as well as individual client invoices. A second computer serves as a sequence controller to operate mail piece handling machinery according to the grouped addresses. The present invention further comprises the mail piece handling machinery for physical commingling and addressing of the different merchants non-alike pieces. The mail piece handling machinery includes hopper/feeders adjustable to hold and singly eject any of various sized and/or type pieces, transporting or conveying means for receiving the pieces from the hopper/feeders and moving the pieces in data base order to an addressing means, and the addressing means for placing the proper address, including bar codes needed to obtain low postal rates, on each piece.

A bundling, stacking or separating mechanism for receiving the addressed pieces and maintaining the pieces in segregated groups or bundles is also provided.

BRIEF DESCRIPTION OF THE DRAWINGS

A greater understanding of the present invention will be realized upon reading the detailed description of the preferred embodiment in conjunction with the attached drawings of which.

DETAILED DESCRIPTION OF THE PREFERRED EMBODIMENT

Figure 1:
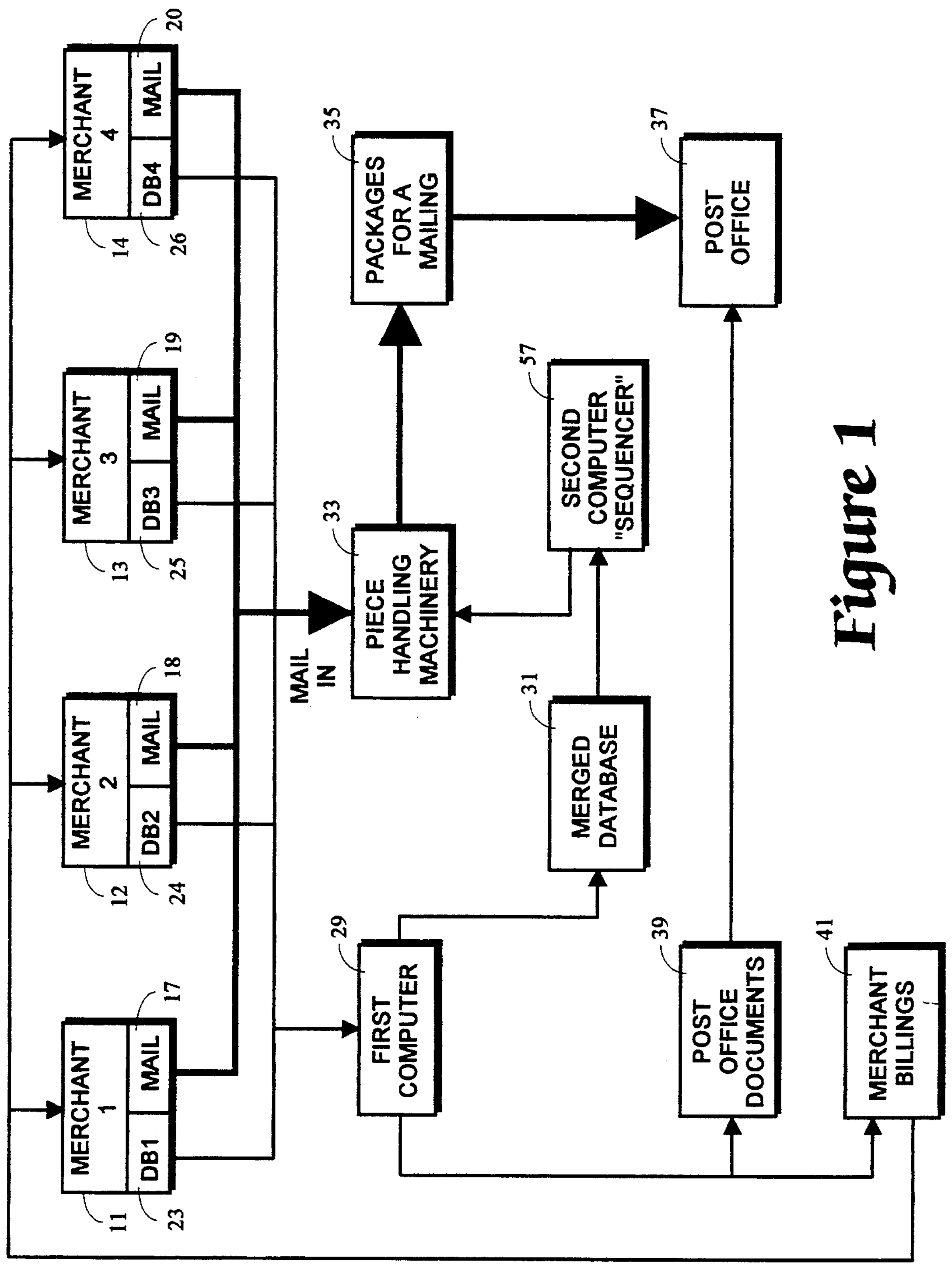
FIG. 1 is a block diagram illustrating the development of a commingled mailing according the present invention.

As seen in FIG. 1, the apparatus of the present invention wall be described as capable of handling four input sources 11,12,15,14. It will be appreciated that the apparatus is conveniently modularized and is not limited to four inputs. The input sources are merchants, or other mailing service customers, typically with different pieces, 17, 18, 19, 20 to have mailed; and different address lists, or data bases, 23, 24, 25, 26, to which the pieces must be mailed.

The data bases 23–26 are merged and sorted according to the lowest common postal rate by a digital data handling apparatus or apparatuses, hereinafter simply called first computer 29, as further explained below, to produce a merged data base 31. A second computer, hereinafter called a sequence controller 57, then uses the merged data base 51 in conjunction with other programming to control the piece handling machinery 33 used to physically commingle, address and segregate the pieces 17–20 into groups of packages, or bundles, constituting mailing 35 suitable for delivery to the post office 37 to be delivered at the lowest available postal rate.

In addition, the first computer 29 generates a manifest, client package report or other documentation 39 required by the post office to accompany each mailing. The first computer 29 also generates invoices 41 for each merchant in the merged data base according the number of pieces mailed at each postal rate. It will be appreciated by the artisan that this accounting in the system could be done at various levels of automation and sophistication.

Figure 2:
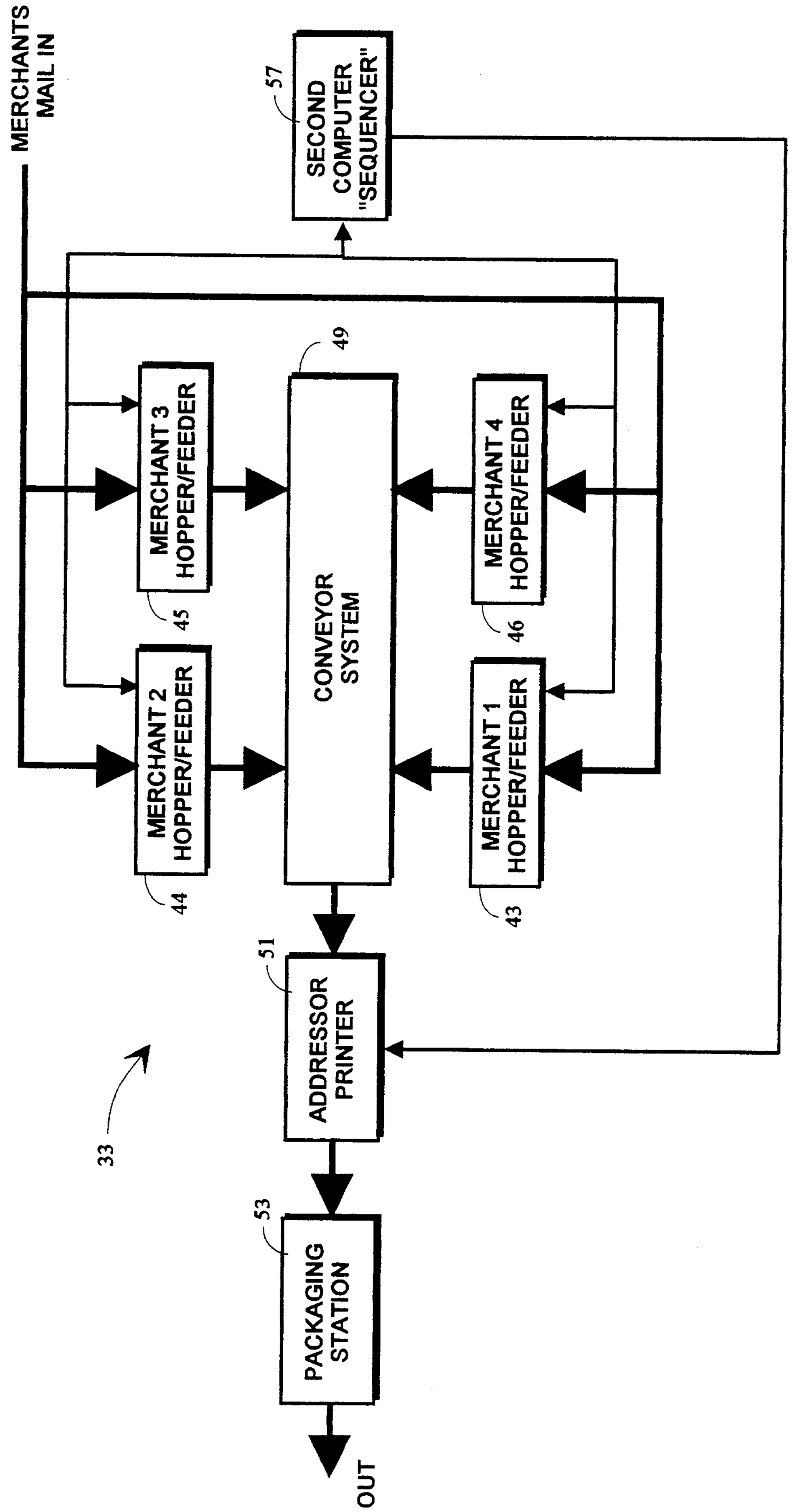
FIG. 2 is a block diagram of the apparatus for accomplishing a commingled mailing.
Figure 3:
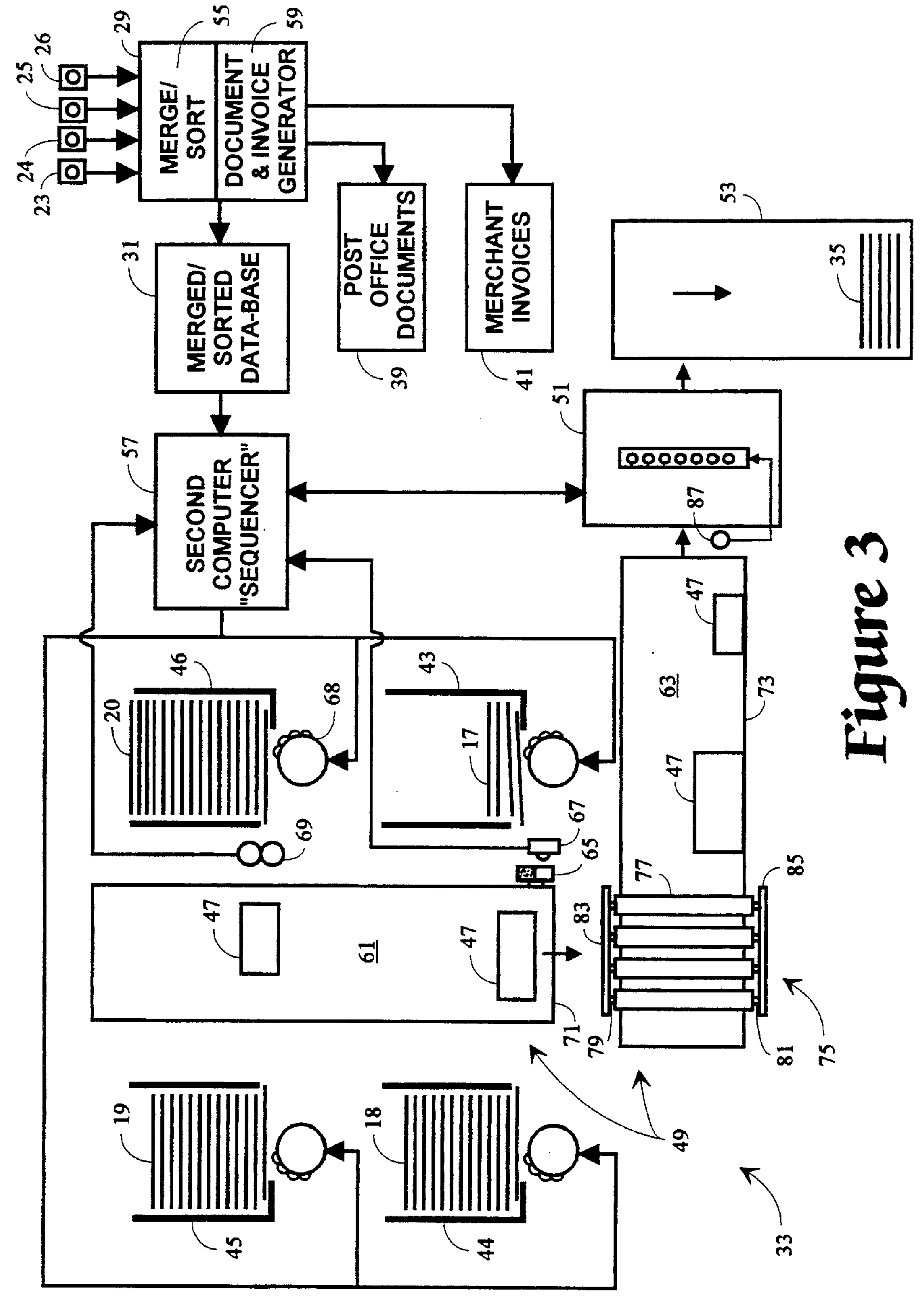
FIG. 3 schematically illustrates the machinery of the apparatus according to the preferred embodiment of the invention.

As seen in FIGS. 2 and 3 the machinery of the present invention comprises the sequence controller 57 as a control means. Hopper/feeders 45, 44, 45, 46, are provided for containing stacks of the different piece types 17–20 and delivering individual pieces 47 from a stack to a conveyor system 49, in the order dictated by the merged data base 51. The conveyor system then serially delivers each piece to an addressor, or printer 51, which applies the appropriate address, and machine-readable characters to the piece. It will be appreciated that a label applying mechanism could be substituted for the printer if necessary or desirable. A packaging station 53 then accepts the pieces from the printer 51 and serves as means for appropriately segregating the pieces into individual bundles constituting the mailing suitable for delivery to the post office. Provisions for hand-packaging could also be made if automatic bundling is not desired.

As seen in FIG. 3, the first commuter 29 has two functions: The data base merging means 55 and the manifest and invoice generator 59.

The data base merging means 55 is operated to take each merchants' address list, or data base 25–26, illustrated as being stored on floppy disks, and produce a merged data base 31 of addresses, grouping the addresses into the lowest postal rate groupings and assigning additional addressing information such as a "zip plus four" zip code and post office required bar code information to each address as required for the lowest postal rates. A "record" or "entry" is created in the merged data base containing all needed information for each address, and adding to each record a tag to identify the source of the record, i.e. the merchant whose list it came from, and/or an identifier for which hopper/-feeder 43–46 the pieces 47 are put into. Also added to each record by a separate application program is a bundle identifier for use in conjunction with the identifier tag to provide necessary data for the post office documentation and invoice generator. The grouping of the records into the lowest postal rate bundle and the assigning of zip codes and bar codes may be accomplished by commercially available software such as is available from PostalSoft (trade name) of La Crosse, Wis. or other sources. The merged data base 51 is then input to a sequence controller 57.

In the preferred embodiments the mail piece transporter, or conveyor system 49, comprises a hopper belt 61 and a printer belt 65. The hopper belt 61 runs in the horizontal plane between opposed pairs of hopper feeders, e.g. 45 and 44. Attached to a drive roller (not shown) of the hopper belt 61 is a timing wheel 65 which is optically sensed by a photo detector 67 or the like to serve as a means for determining belt travel, which in turn triggers the sequence controller 57 as further explained below.

The opposed pairs of hopper/feeders 43–46 are constructed so as to receive a plurality of various types of mail pieces and have an adjustable feeder mechanism 68 in order to feed a variety of pieces of different thickness reliably one at a time onto the hopper belt 61. The design of such adjustable feeder mechanisms is considered to be within the competence of the ordinarily skilled artisan. It will be appreciated that pieces from different merchants can also be of like type. The important consideration is that the mailing service will not know in advance what type of pieces the merchants will bring in and thus the hopper/feeders 43–46 must be adjustable to accommodate a variety of piece types.

A thickness sensor 69 is located at the output of each hopper/feeder, e.g. 46, for sensing the feeder output to provide a fail safe mechanism against "no-feeds" or "double-feeds" which would disrupt the serial progression of apparatus operation and result in inaccurate addressing and packaging of the pieces into mailings.

Figure 4:
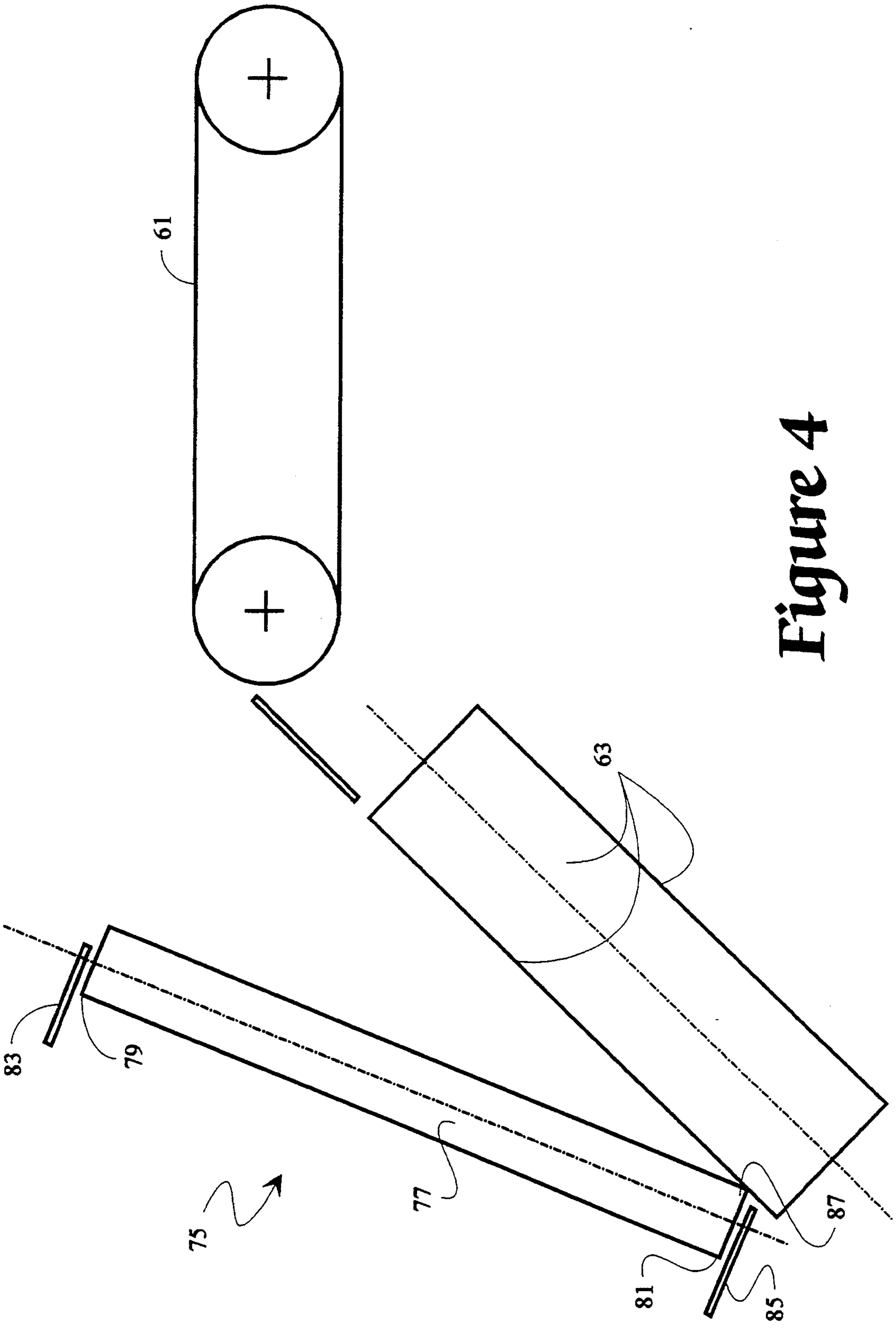
FIG. 4 schematically illustrates the wedge roller used to brake and position pieces onto the printer belt.

Located at the delivery end 71 of the hopper belt 61 and at a right angle thereto is the printer belt 63 for delivery of the now co-mingled pieces 47 to the address printer 51. As best seen in FIG. 4, the printer belt 63 is oriented substantially inclined toward the vertical plane so that a piece falling from the horizontal hopper belt 61 to the vertical printer belt 63 will strike the bottom edge 73 of the printer belt 63 and be edge oriented properly for delivery to the printer 51. While this particular juxtaposition of the hopper belt 61 and printer belt 63 result in a space savings, other arrangements including the provision of a single in-line piece transporter are possible.

A roller-wedge 75 is placed over the printer belt 63 to brake the fall and ensure proper orientation of the pieces onto the printer belt 63. As seen in FIGS. 3 and 4, the roller wedge 75 is a series of hard plastic rollers 77 rotatably connected in line at their upper and lower axles 79 and 81, respectively, by frames 83, 85. The roller wedge 75 is placed at an angle to the printer belt 63 with the bottom ends 87 of the rollers 77 touching the belt 63 so as to drive the rollers. The fall of the piece coming off the hopper belt 61 is thereby braked in the wedge space between the roller wedge 75 and the printer belt 63 eliminating drag on the piece in the drive direction while lessening the chance of bouncing and interruption to the flow of the pieces while properly orienting the piece on the printer belt 63 and providing traction to drive the piece toward a printer 51.

An ink jet printer 51, or other suitable printing, or label-applying, means is positioned downstream from the roller wedge 75 adjacent the printer belt 65 for serially receiving the pieces 47 and addressing them according to the serial listing of records in the sequence controller 57. A leading edge detector 87 is supplied with the printer 51 to determine when a piece is presented for printing.

A packaging station 53 is provided downstream from the output of the printer 51 for bundling the pieces 47 in the proper order. Automatic banding assemblies suitable for use in the packaging station are well known in the art.

The package report/invoice generator 59 of the first computer 29 will produce a package report for the mailing as required by the post office and also an invoice for billing the merchants on conventional computer I/O peripherals upon completion of the merged data base or upon successful completion of a co-mingled mailing as desired.

Figure 5:
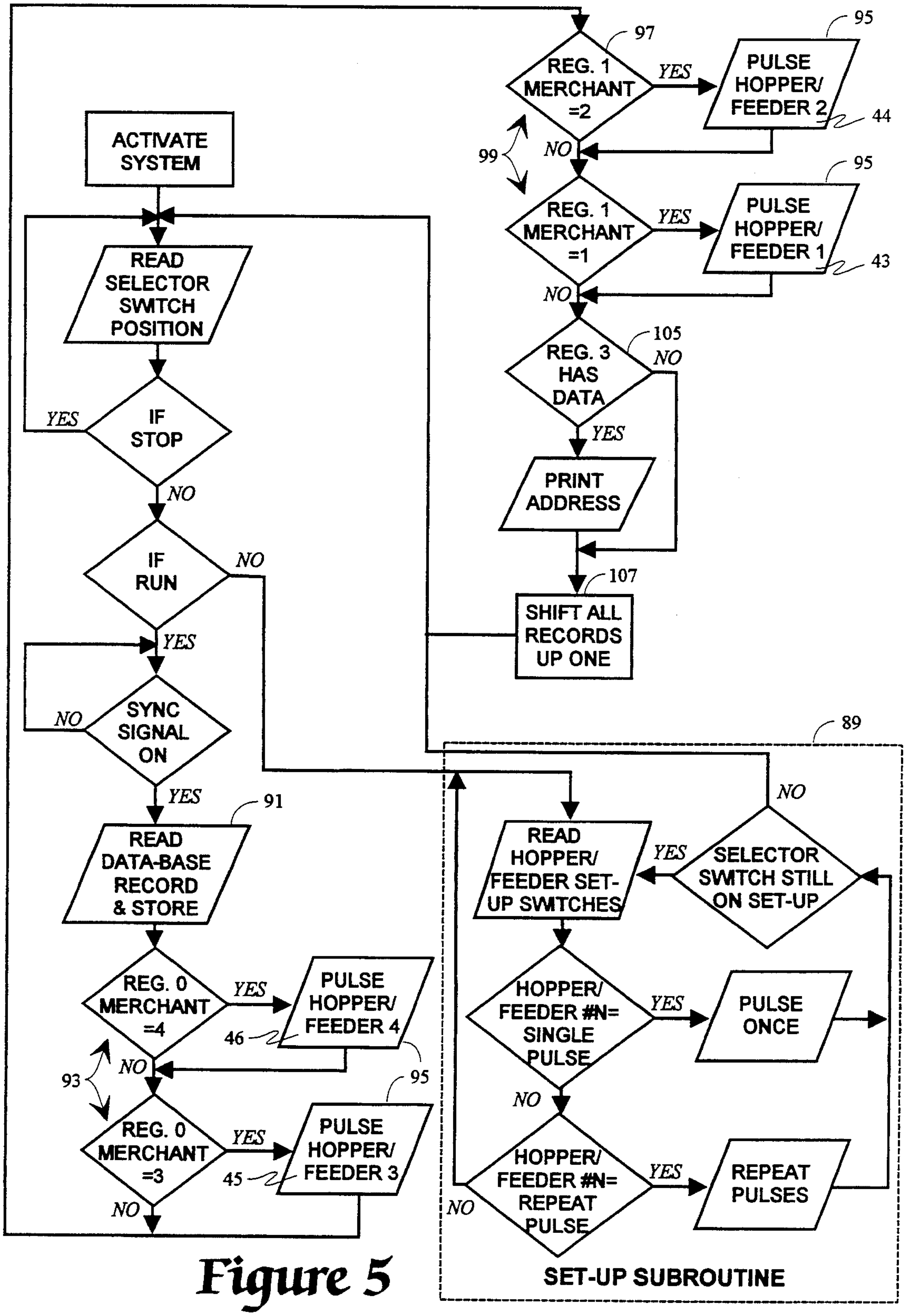
FIG. 5 is a simplified flow chart of the sequence-controller operation.

As seen in FIG. 5, after the hopper/feeders have been loaded with the pieces, the sequence controller will run the set-up sub-routine 89 enabling manual pulsing of the hopper/feeders 43–46 to allow for adjustments and to ensure a single piece feed for each operation, or pulsing, of the hopper/feeder. When this optimization is completed, the operator switches the sequence controller 57 from "set-up" to "run" to initiate physical co-mingling of the mailing according to the records in the merged data base 31.

Figure 6:
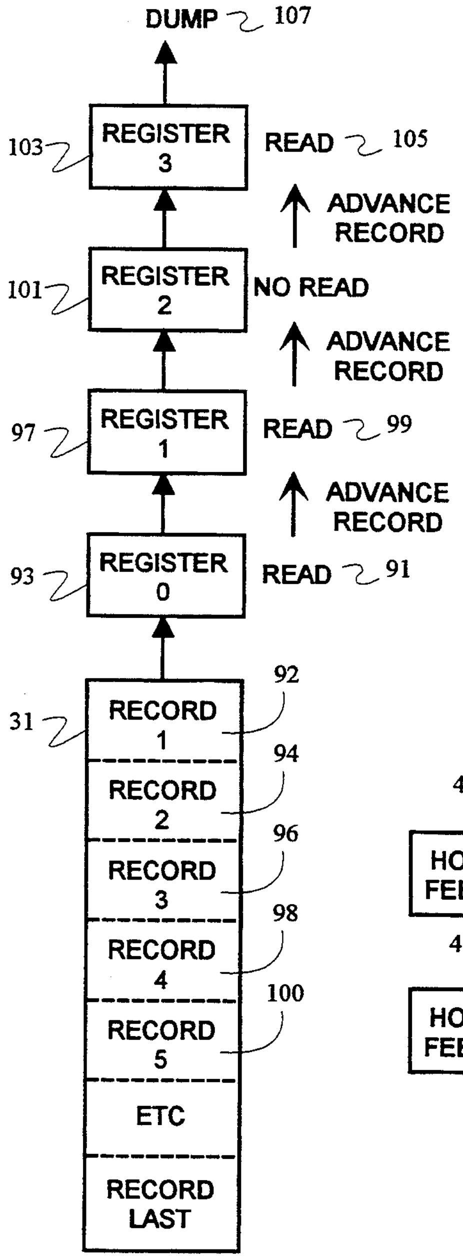
FIGS. 6 and 6A are illustrations of the mail piece handling machinery in conjunction with the sequence-controller operation.
Figure 6A:
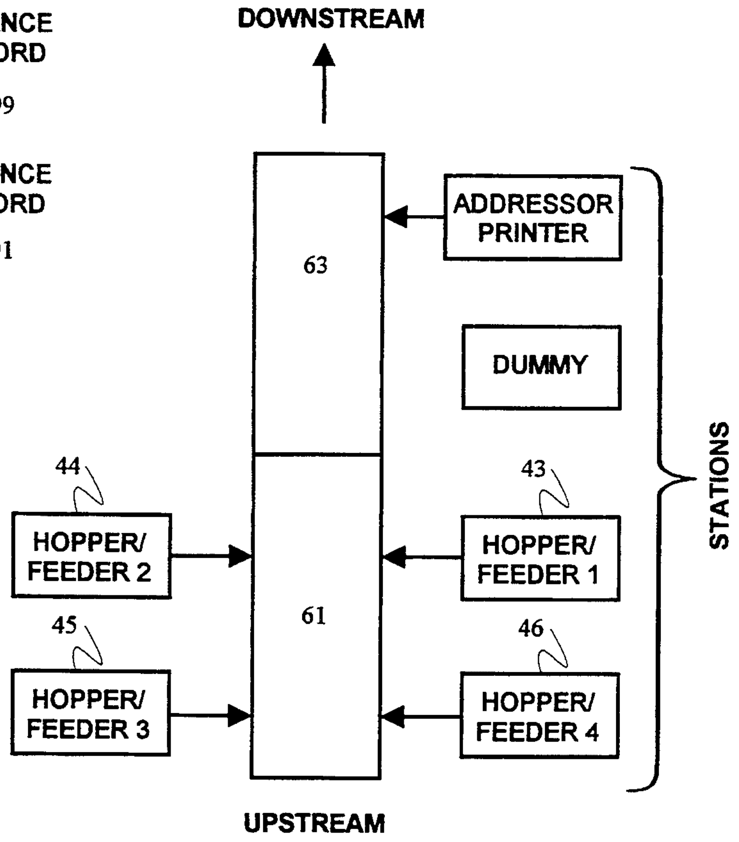

As seen in FIGS. 5, 6A and 6, the sequence controller 57 operates on a "bubbler" routine serially advancing the records so that a record is read at the proper times as the piece physically moves to different operational stations through the machine. As the hopper belt 61 is known to be activated, and at a known position the sequence controller 57 reads, at ref. #91, the first record 92 nominally within the controller in a "register zero" 93, to see if it belongs to merchant four or three, i.e. whether a piece from either of the upstream hoppers/feeders 45, 46 should be ejected onto the hopper belt 61. If yes, then a signal 95 is issued to pulse the appropriate feeder mechanism 68 on the hopper/feeder 45 or 46. If not, the sequence controller 57 cycles the first record 92 to register one 97 and waits until the hopper belt timing wheel 65 indicates it has traveled to the downstream pair of hopper/feeders 43,44 and the sequence/controller 57 reads, as at ref. #99, the first record 92 again to see if it belongs to merchant two or one, then signals, as at ref. #95 to pulse the appropriate hopper/feeder to eject a piece. The thickness sensor 69 will monitor the output of the hopper/feeder. If proper feed data is not present a subroutine (not shown) can be initiated to bypass and divert that piece and re-enter it at the end of the mailing or at another suitable time or shutdown the apparatus.

It will be appreciated that if the first record inquiry is negative for hoppers/feeders four and three, the sequence controller 57 is cycled and the first record 92 moves up to register one 97. The second record 94, in register zero 93, now is read so that both the first 92 and second 94 records can pulse a feeder simultaneously if, of course, the second record 94 indicates it belongs to merchant three or four. If not, the sequence controller is cycled upon indication of appropriate hopper belt 61 travel and the second record 94 moves to register one 97 and the third record 96 is placed in register zero 93. The first record 91 is moved up to register two 101, which is a dummy register requiring no reading of the record. This is done for spacing and timing purposes. It will be realized that this or similar dummy registers may be added or deleted depending on the nature or the machinery selected to accomplish the tasks according to the present invention. The sequence controller reads registers zero and one to determine if any hopper/feeders 43–46 should be pulsed.

When the timing wheel 65 again indicates another increment of hopper belt 61 travel, the sequence controller 57 is again cycled, bringing the fourth record 98 into register zero 93 and advancing the third through first records up to registers one through three 97, 101, 103 respectively. Registers zero 93 and one 97 are again read to determine if the hopper/feeders 43–46 should be pulsed, and register three 103 is read 185 to determine if address data is present. If so, the address data is sent to the printer 51 to be applied to the piece 47 as determined by the leading edge detector 87. If address information is not present it indicates that the first piece has not yet arrived at the printer 51 and the print routine is therefore bypassed for that cycle.

At the next cycling of the sequence controller 57, record five 100 is placed in register zero 93, records two through four 94, 96, 98 are moved up one register, the records are appropriately read, and record one is abandoned, as at ref. #107.

When the sequence controller 57 has cycled all records in a mailing it issues appropriate instructions to the operator and/or the packaging station 53 to segregate that bundle for delivery to the post office. Instructions may also be issued at this time for the client package reporter 59 to prepare required postal documentation based on the pieces passed to the mailing; and to the invoicer 59 to prepare billings to the merchants, based on the postal rate obtained and number of pieces mailed. The postal documentation and/or invoices can be extracted from the first computer by comparing the merged data base against the postal rate groupings and merchant identifiers using a suitable software program adapted for the present use.

It will be appreciated by the artisan that the physical descriptions of registers and the like in the sequence controller are utilized for explanatory purposes and are not necessarily to be taken as literal descriptions of the sequence controller programming, which may be constructed on any format suitable to the functional units. Further, all computer functions could be combined into a single data processor if desired.

The foregoing description of the preferred embodiment is meant to be illustrative only, it being contemplated that modifications or additions thereto within the scope of the present invention will occur to those skilled in the art.

Having thus described the invention, what is claimed is:

1. An apparatus for co-mingling pre-printed, non-alike, substantially complete unaddressed mail pieces, from a plurality of un-predetermined sources into a single bundle having a low postage rate comprising:

a) a sequence controller for receiving a sequenced and grouped listing of addresses merged from the sources according to the low postage rate, the addresses being identified by their sources, and for controlling mail piece handling machinery according to the listing;

b) mail piece handling machinery operably inter-connected to the sequence controller including:

1) a plurality of hopper/feeders, each hopper/-feeder being constructed and arranged to hold a plurality of one type of the non-alike substantially complete mail pieces from one of the un-predetermined sources and to eject a single one of said substantially complete non-alike mail pieces onto a mail piece transporter at a command of the sequence controller thereby commingling the non-alike mail pieces according to the sequenced listing received by the sequence controller , 2) a mail piece transporter for receiving the commingled non-alike mail pieces from the hopper/-feeders and transporting the commingled mail pieces, 3) an addressor for receiving the commingled mail pieces from the mail piece transporter, and applying addresses to the mail pieces consistent with the low postage rate.

2. The apparatus of claim 1 further comprising means for combining lists of addresses from the plurality of sources to create the grouped listings of addresses.

3. The apparatus of claim 2 wherein the means for combining lists further comprises means for generating additional addressing information required by a post office for the low postage rate.

4. The apparatus of claim 1 further comprising a packaging station for receiving the pieces from the addressor and maintaining the pieces in segregated bundles according to the low postal rate groupings.

5. The apparatus of claim 4 wherein the packaging station further includes means for automatically segregating the bundles.

6. The apparatus of claim 1 wherein the sequence controller further includes a sub-routine enabling optimal mechanical adjustment of the hopper/feeders.

7. The apparatus of claim 1 wherein the mail piece transporter further includes a first moving belt and a second moving belt arranged substantially orthogonally to each other.

8. The apparatus of claim 7 further comprising a wedge-roller having rollers placed at an angle to one of said belts to properly orient the mail piece during transport thereof.

9. The apparatus of claim 1 wherein the mail piece transporter further comprises means for properly orienting a mail piece on the mail piece transporter.

10. The apparatus of claim 1 wherein the mailpiece transporter has first and second sides parallel with the direction of transporting; and at least one of the hopper/feeders is located on the first transporter side and at least one of the hopper/feeders is located on the second transporter side.

11. The apparatus of claim 10 wherein the hopper/-feeders are arranged in opposing pairs with a first hopper/feeder located on the first transporter side and a second hopper/feeder located on the second transporter side.

12. The apparatus of claim 1 further comprising means for producing the documentation required for the mailing by the post office.

13. The apparatus of claim 2 further comprising means for assigning a bundle number to each address for identifing the bundle the address belongs to.

14. The apparatus of claim 13 further comprising means for producing an invoice of the mailing for each of the un-predetermined sources detailing a count of pieces and a postage rate for each piece in the mailing.

15. An apparatus for co-mingling pre-printed, non-alike, substantially complete unaddressed mail pieces, from a plurality of un-predetermined sources into a single bundle having a low postage rate comprising:

a) means for combining lists of addresses from the plurality of sources to create a merged data base, the means for combining including means for grouping the addresses according to the low postal rate;

b) means for creating a record for each address, the record containing all information necessary to process that address by the apparatus, the means for creating including:

1) means for generating additional addressing information required by a postal service for addresses, and:

2) means for assigning an identifier to each address for identifying the source of the address;

c) a sequence controller for receiving the records of the grouped addresses and for controlling mail piece handling machinery according to the records;

d) mail piece handling machinery operably inter-connected to the sequence controller including:

1) a plurality of adjustable hopper/feeders, each hopper/feeder being constructed and arranged to hold a plurality of one type of the non-alike substantially complete mail pieces from one of the un-predetermined sources and to eject a single one of the substantially complete non-alike mail pieces onto a mail piece transporter at a command of the sequence controller thereby commingling the non-alike mail pieces according to the sequenced listing received by the sequence controller, 2) the mail piece transporter for receiving the commingled mail pieces from the hopper/feeders and transporting the mail pieces to an addressor, the mail piece transporter having means for communicating its operational characteristics to the sequence controller, 3) the addressor for receiving the commingled mail pieces from the mail piece transporter, and applying at least some of the information from one record to one of the mail pieces; and e) a packaging station for maintaining the pieces having the records applied thereto in segregated bundles according to the lowest postal rate groupings.

16. The apparatus according to claim 15 further comprising means for producing the documentation for the bundle required by the post office.

17. The apparatus of claim 15 wherein the means for creating a record further comprises means for assigning a bundle number to each address for identifying the group the address belongs to.

18. The apparatus according to claim 17 further comprising means for producing an invoice of the mailing for each of the un-predetermined sources detailing a count of pieces and a postage rate for the pieces in the bundle.

19. A method for commingling different groups of substantially complete mail pieces of different size and shape from different unpredetermined sources wishing to mail the mail pieces to each of a different list of addresses, into a single mailing having a low postage rate comprising:

A) compiling each of said address lists from each of said different sources into at least one combined address list, said combined address list being ordered by addresses contained therein according to a low postal rate grouping based on a commingling of said address lists, each of said addresses also have a hopper/feeder identifier associated therewith;

B) placing each one of said different groups of substantially complete different mail pieces into a different hopper/feeder apparatus;

C) ejecting said different mail pieces from said hopper/feeder apparatus according to said hopper/-feeder identifier such that the pieces land on a transport belt in the order of said combined address list; and D) addressing said mail pieces in the order received from said transport belt.

* * * * *